US008793597B2

(12) United States Patent
Maguire

(10) Patent No.: US 8,793,597 B2
(45) Date of Patent: *Jul. 29, 2014

(54) USER INTERFACE AND METHOD FOR VIEWING SHORT MESSAGES ON A WIRELESS DEVICE

(75) Inventor: Michael Maguire, Waterloo (CA)

(73) Assignee: BlackBerry Limited, Waterloo (CA)

( * ) Notice: Subject to any disclaimer, the term of this patent is extended or adjusted under 35 U.S.C. 154(b) by 456 days.

This patent is subject to a terminal disclaimer.

(21) Appl. No.: 13/158,551

(22) Filed: Jun. 13, 2011

(65) Prior Publication Data

US 2011/0281598 A1  Nov. 17, 2011

Related U.S. Application Data

(63) Continuation of application No. 12/892,042, filed on Sep. 28, 2010, now Pat. No. 8,434,011, which is a continuation of application No. 12/339,246, filed on Dec. 19, 2008, now Pat. No. 7,827,497, which is a continuation of application No. 11/338,944, filed on Jan. 25, 2006, now Pat. No. 7,484,177, which is a continuation of application No. 09/904,364, filed on Jul. 12, 2001, now Pat. No. 7,028,263.

(60) Provisional application No. 60/219,793, filed on Jul. 19, 2000.

(51) Int. Cl.
*G06F 15/00* (2006.01)
*G06F 13/00* (2006.01)
*H04M 1/725* (2006.01)

(52) U.S. Cl.
CPC ...... *H04M 1/72552* (2013.01); *H04M 1/72547* (2013.01)

USPC .......................................... 715/758; 715/741

(58) Field of Classification Search
CPC ...................... H04M 1/72552; H04M 1/72547
USPC ......... 715/758–759, 741, 752, 763–765, 700, 715/736, 751; 455/455–456
See application file for complete search history.

(56) References Cited

U.S. PATENT DOCUMENTS 5,708,804 A   1/1998   Goodwin et al.
5,905,863 A   5/1999   Knowles et al.
(Continued)

FOREIGN PATENT DOCUMENTS

EP   0932130 A2   7/1999
JP   10-013881 A2   1/1998

OTHER PUBLICATIONS

Microsoft Corp.; Microsoft® Outlook® 2000; ©1999.
U.S. Appl. No. 12/892,042, filed Sep. 28, 2010.
(Continued)

*Primary Examiner* — Kevin Nguyen
(74) *Attorney, Agent, or Firm* — Brett J. Slaney; Blake, Cassels & Graydon LLP

(57) ABSTRACT

A method is performed by an electronic communication device. The method includes storing electronic messages, and storing criteria for determining whether a stored message is related to a current message. A current electronic message is displayed to a user of the communication device, including the current message's outside address and message body. The relevance of each of the stored messages to the current message is assessed based on the previously-stored criteria. Those messages that meet the criteria are selected and displayed along with the current message.

20 Claims, 5 Drawing Sheets

(56) References Cited

U.S. PATENT DOCUMENTS

| | | | |
|---|---|---|---|
| 6,018,761 A | 1/2000 | Uomini | |
| 6,029,164 A | 2/2000 | Birrell et al. | |
| 6,085,100 A | 7/2000 | Tarnanen | |
| 6,151,507 A * | 11/2000 | Laiho et al. | 455/466 |
| 6,169,911 B1 | 1/2001 | Wagner et al. | |
| 6,178,331 B1 * | 1/2001 | Holmes et al. | 455/466 |
| 6,309,305 B1 | 10/2001 | Kraft | |
| 6,346,952 B1 | 2/2002 | Shtivelman | |
| 6,630,944 B1 | 10/2003 | Kakuta et al. | |
| 6,727,916 B1 | 4/2004 | Ballard | |
| 6,826,596 B1 | 11/2004 | Suzuki | |

OTHER PUBLICATIONS

U.S. Appl. No. 12/339,246, filed Dec. 18, 2008.
U.S. Appl. No. 12/339,246, filed Dec. 19, 2008.
U.S. Appl. No. 11/338,944, filed Jan. 25, 2006.
U.S. Appl. No. 09/904,364, filed Jul. 12, 2001.

* cited by examiner

FROM: 888-7342

USER INTERFACE AND METHOD FOR VIEWING SHORT MESSAGES ON A WIRELESS DEVICE

CROSS-REFERENCE TO RELATED APPLICATIONS

This is a continuation of U.S. patent application Ser. No. 12/892,042 filed Sep. 28, 2010, which is a continuation of U.S. patent application Ser. No. 12/339,246, filed Dec. 19, 2008 (now U.S. Pat. No. 7,827,497), which is a continuation of U.S. patent application Ser. No. 11/338,944, filed Jan. 25, 2006 (now U.S. Pat. No. 7,484,177), which is a continuation of U.S. patent application Ser. No. 09/904,364, filed Jul. 12, 2001 (now U.S. Pat. No. 7,028,263), which claims benefit of U.S. Provisional Application No. 60/219,793, filed Jul. 19, 2000, all five applications hereby incorporated herein by reference.

TECHNICAL FIELD

This invention relates generally to a user interface for electronic messaging. More particularly, the invention provides a user interface and method for displaying an electronic message in context with select stored electronic messages. The invention is particularly well-suited for displaying short messaging service (SMS) messages on Personal Digital Assistants, mobile communication devices, cellular phones, and wireless two-way e-mail communication devices (collectively referred to herein as "wireless devices"). The invention provides utility, however, in any device that displays electronic messages of any type.

BACKGROUND

Most cellular networks provide a short messaging service (SMS) whereby a short electronic message may be transmitted between wireless devices. The user interfaces currently available for viewing SMS messages on a wireless device, however, only enable a user to view the contents of one message at a time. For example, FIG. 1 shows a typical user interface 10 for viewing an SMS message on a wireless device. This known user interface 10 only displays the text of the message ("6:30 pm"), and the sender or receiver information associated with the message ("From: 888-7342"). Viewing only the information shown in FIG. 1, a user may be unable to place the message in context. For instance, the message "6:30 pm" might have been received in response to an earlier electronic message sent by the user. If the user could not recall his or her previous message, however, the response "6:30 pm" would be meaningless.

SUMMARY

A user interface and method for viewing short messages on a wireless device includes a viewing screen, a processor, a memory device and a message software interface module. The memory device stores electronic messages that have been transmitted or received by the wireless device. The message software interface module is executed by the processor and (a) displays a current electronic message on the viewing screen, (b) filters each of the electronic messages stored in the memory device to identify one or more select messages meeting a pre-set criteria, and (c) displays the one or more select messages on the viewing screen along with the current electronic message.

BRIEF DESCRIPTION OF THE DRAWINGS

Figure 1:
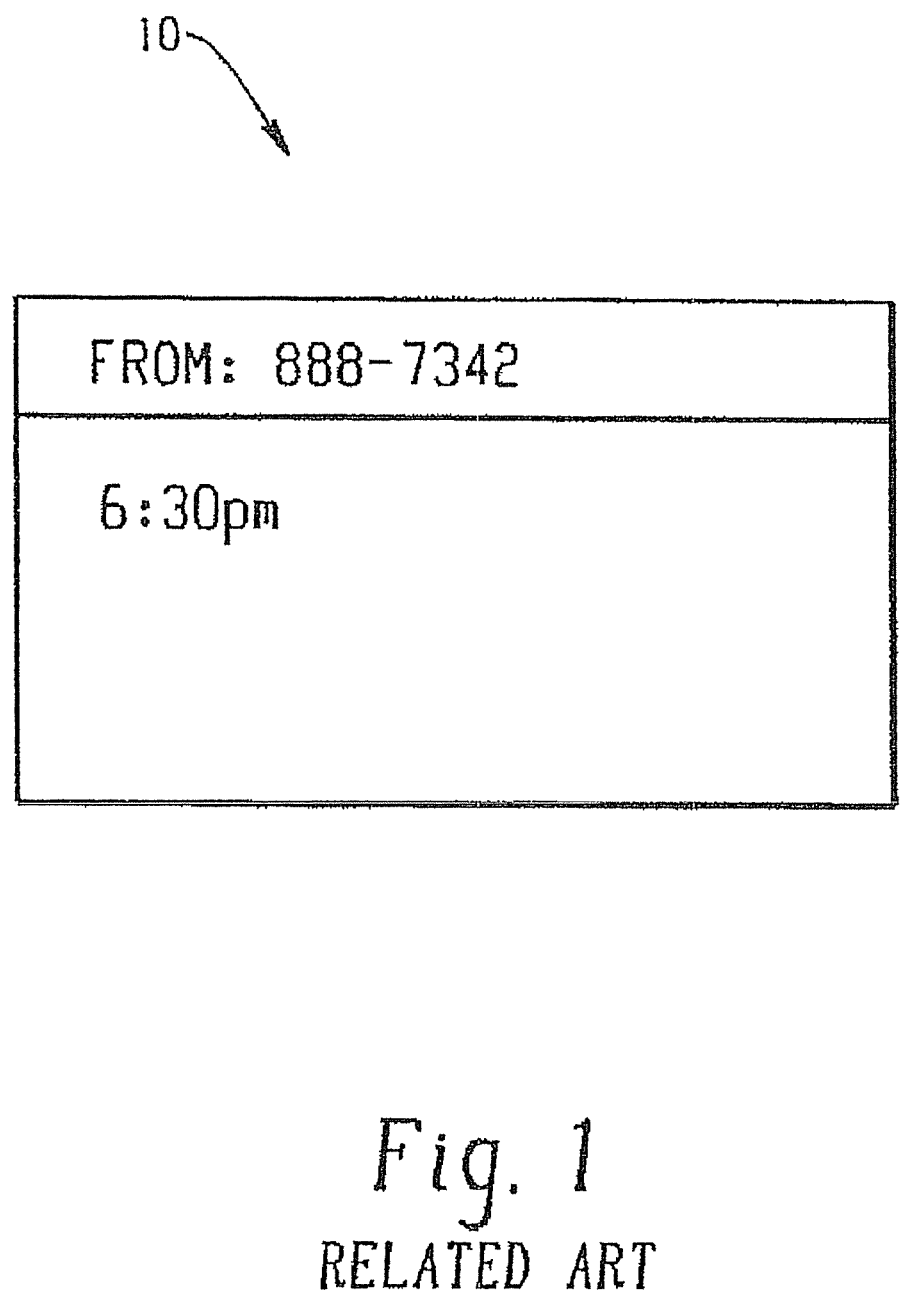

FIG. 1 shows a typical user interface for viewing SMS messages on a wireless device;

DETAILED DESCRIPTION

Figure 2:
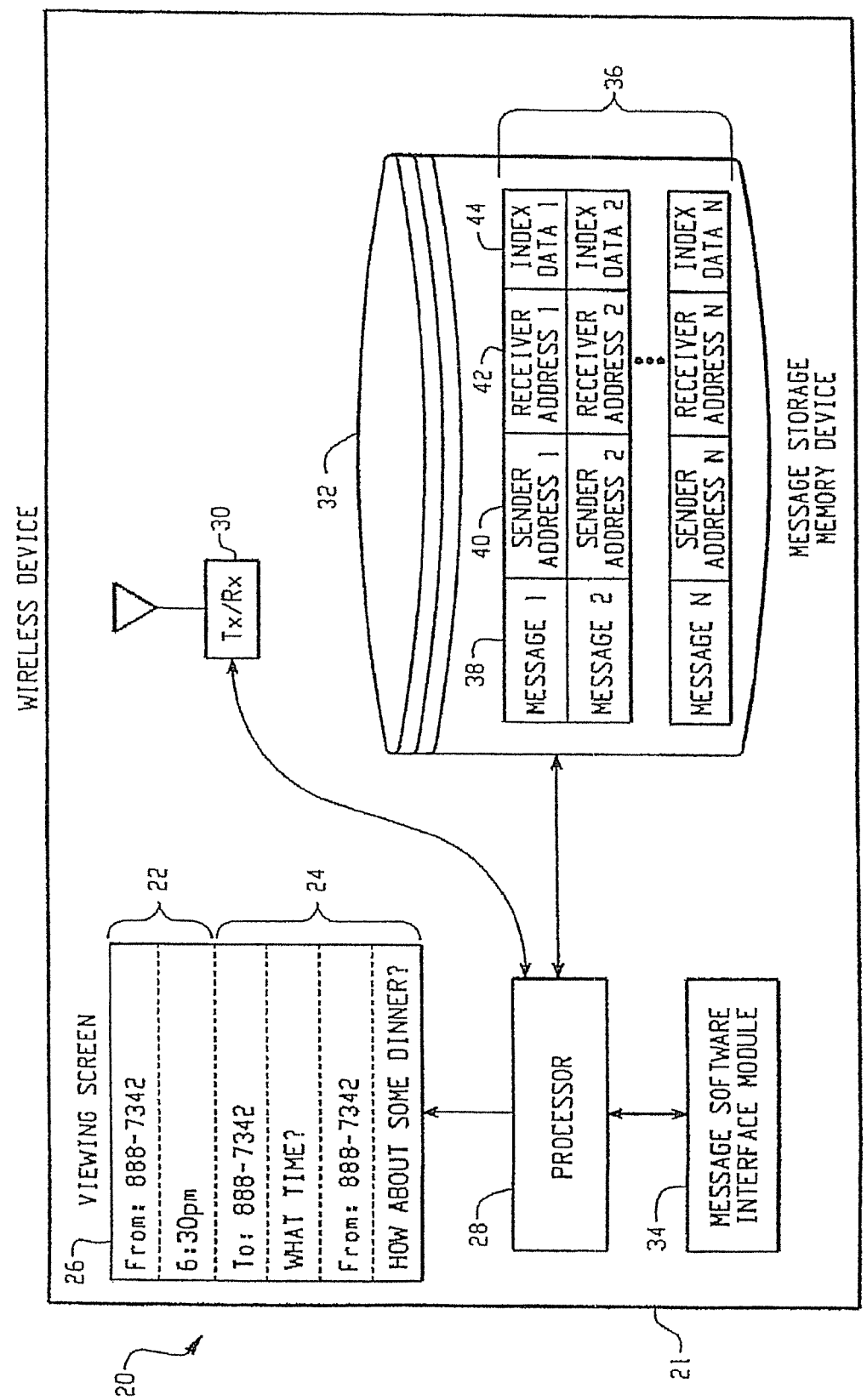
FIG. 2 shows an exemplary user interface for viewing an electronic message in context with select stored electronic messages according to an embodiment of the claimed invention.

Referring now to the figures, FIG. 2 shows an exemplary user interface 20 for a wireless device 21 that displays a current electronic message 22 in context with select stored electronic messages 24. The user interface 20 includes a viewing screen 26, a processor 28, a transceiver 30, and a memory device 32. The user interface 20 also includes a message software interface module 34 that is executed by the processor 28. Operationally, the message software interface module 34 stores incoming and outgoing electronic messages 36 in the memory device 32, and enables a user to simultaneously view the current incoming or outgoing message 22 and the select stored electronic messages 24.

The message software interface module 34 preferably saves and indexes every electronic message transmitted or received by the wireless device 21. In an alternative embodiment, the message software interface module 34 may give the user the option to choose which messages to save and which to discard.

Each stored electronic message 36 preferably includes a message body 38 and both a sender address 40 (the "From" address) and a receiver address 42 (the "To" address). The sender and receiver addresses displayed on the viewing screen 26 in FIG. 2, for example, are in the form of a telephone number which is typical for SMS messages. It should be understood, however, that the user interface 20 is not limited to use with SMS messages. Rather, the user interface 20 may be used with any form of electronic message, such as e-mail messages and SMS messages.

In addition to the sender and receiver addresses 40 and 42, the message software interface module 34 may also attach some type of indexing data 44 to each message, such as an ordinal value or an electronic time-stamp indicating when the message was transmitted or received.

Alternatively, the stored electronic messages 36 may include a message body 36, indexing data 44, and an outside address only. The outside address of a message can be either the sender address 40 or the receiver address 42, depending upon the context of the message. For instance, if a message was received by the wireless device 21, the outside address is the sender address 42 (the "From" address). If, on the other hand, a message has been, or will be, transmitted from the wireless device 21, then the outside address is the receiver address (the "To" address). If the message software interface module 34 stores only the outside address, however, then the indexing data 44 should preferably indicate whether the stored electronic message was incoming or outgoing.

In addition to saving and indexing incoming and outgoing messages, the message software interface module 34 filters the stored electronic messages 36 to select messages relating to the current electronic message 22, and displays the current electronic message 22 along with the select messages 26. The current electronic message 22 may preferably be any message (stored or otherwise) currently being accessed by the user. For instance, the current electronic message 22 may be a new message being composed by the user, a message recently received by the wireless device 21, or any stored electronic message 36 selected by the user. Once a current electronic message 22 has been selected, the message software interface module 34 preferably assesses each stored electronic message 36 to identify select messages 24 having matching outside addresses. The message software interface module 34 may then further limit the select messages 24 using the indexing data 44. For example, in FIG. 2 the current electronic message 22 includes the outside address, "From: 888-7342." The select messages 24 were preferably identified from among the stored electronic messages 36 because they each include the matching outside address "888-7342" as either their sender address 40 or receiver address 42. In addition, the message software interface module 34 may have limited the select messages 24 to those shown by comparing the indexing data 44 of the current and stored electronic messages for proximity. The operation of identifying select messages 24 is discussed in further detail with respect to FIGS. 3, 4 and 5.

In an alternative embodiment, the message software interface module 34 may display those stored electronic messages 36 that are related to the current electronic message 22 by only the proximity of their indexing data 44. For instance, if the incoming and outgoing messages were indexed according to the order in which they were transmitted or received, the message software interface module 34 may display, along with the current electronic message 22, a select number of the most recently saved messages. Preferably the number of displayed messages is selected by the user. If the current electronic message 22 is selected from among the stored electronic messages 36, then the user may also have the option of displaying a select number of messages that were saved either prior to or after the current electronic message 22.

In another embodiment, the message software interface module 34 may identify related stored electronic messages 24 by comparing the message body 38 of each stored electronic message 36 with a keyword selected by the user. This alternative method of matching the current electronic message 22 with select stored electronic messages 24 may be implemented by itself, or as a means of further limiting the select messages 24 identified by the other methods described herein.

Figure 3:
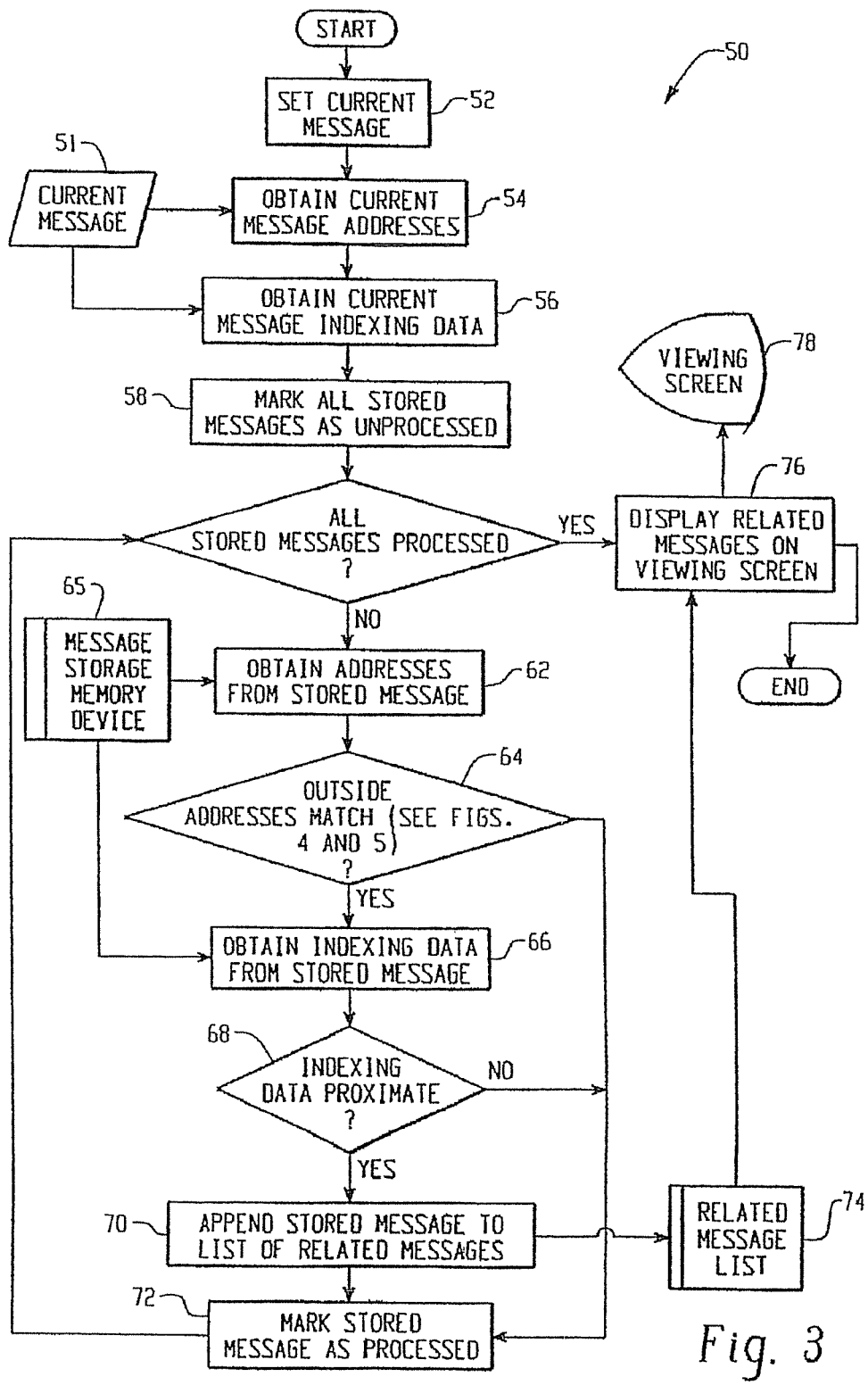
FIG. 3 is a flow diagram showing an exemplary method for identifying stored electronic messages that are related to the current electronic message.

FIG. 3 is a flow diagram showing an exemplary method 50 for identifying stored electronic messages that are related to the current electronic message. In step 52, an electronic message being accessed by the user is set as the current electronic message 51. At step 54, the current sender and receiver addresses are obtained from the current electronic message 51, and it is determined whether the current electronic message 51 is incoming or outgoing. An incoming message refers to an electronic message that has been received by the wireless device, and an outgoing message may refer to either (a) an electronic message that has been transmitted by the wireless device; or (b) a new message being composed by the user.

In step 56, the indexing data is obtained from the current electronic message 51, or, if the current electronic message 51 has not yet been saved, indexing data is generated for the current electronic message 51. For instance, the message software interface module 34 may index stored electronic messages using an electronic time-stamp that indicates the time and date a message was transmitted or received. If the current electronic message 51 has not been saved, then this information may be obtained from the transmission log, and an electronic time-stamp may then be generated. Alternatively, if the stored electronic messages are indexed using an ordinal value, then an unsaved current electronic message may be assigned the next available value.

In step 58, all stored electronic messages are marked as unprocessed in relation to the current electronic message 51. The stored electronic messages may be marked by means of a Boolean flag, a stack of message identifiers, or any other means of distinguishing processed from unprocessed messages. Then, in steps 60-72, each stored electronic message is processed by the message software interface module 34 to determine if it is related to the current electronic message. Once a stored electronic message has been processed, it is marked as processed in step 72, and steps 60-72 are repeated until every stored electronic message has been processed.

In the processing steps 60-72, related messages are selected, preferably based on two pre-set criteria: (a) whether the outside address of the current electronic message 51 matches the outside address of the stored electronic message, and (b) whether the indexing data of the stored electronic message is within a pre-selected storage proximity range in relation to the indexing data of the current electronic message. In steps 62 and 64, the sender and receiver addresses of a stored electronic message are obtained from the message storage memory device 65, and compared with the outside address of the current electronic message 51. An exemplary method for determining whether the outside address of the stored electronic message matches the outside address of the current electronic message is described below with reference to FIGS. 4 and 5. If the outside addresses match, then the proximity of the indexing data is assessed in steps 66 and 68. If the outside addresses do not match, however, then further processing is unnecessary, and the stored electronic message is marked as processed in step 72.

In step 66, the indexing data for the stored electronic message is retrieved from the message storage memory device 65. The indexing data of the stored electronic message is then compared to the indexing data of the current electronic message 51 for proximity at step 68. Preferably, the user may pre-select the storage proximity range within which a stored electronic message must fall to be considered a select message. For example, the user might indicate that all stored electronic messages indexed with an electronic time-stamp that is more than 12 hours different from the time-stamp of the current electronic message are not proximate and should be disregarded. Alternatively, if the stored electronic messages are indexed with an ordinal value, the user might, for example, indicate that only those stored electronic messages within an ordinal distance of 2 from the current electronic message are to be considered proximate. If the stored electronic message is not proximate, then it is marked as processed in step 72.

If, however, the stored electronic message is both proximate and has a matching outside address, then it is appended to a related message list 74 (step 70) before being marked as processed in step 72. The related message list 74 may comprise a collection of unique identifiers that allow the select messages to be identified and retrieved, or, alternatively, it might comprise complete copies of the select messages. In step 76, once all of the stored electronic messages have been processed, the select messages are displayed on the viewing screen 78 along with the current electronic message 51. Each message may be displayed along with its outside address, or alternatively the outside address may be displayed only once since it is the same for each displayed message. In an alternative embodiment, the select messages may appear on the viewing screen 78 as they are identified in step 70.

Figure 4:
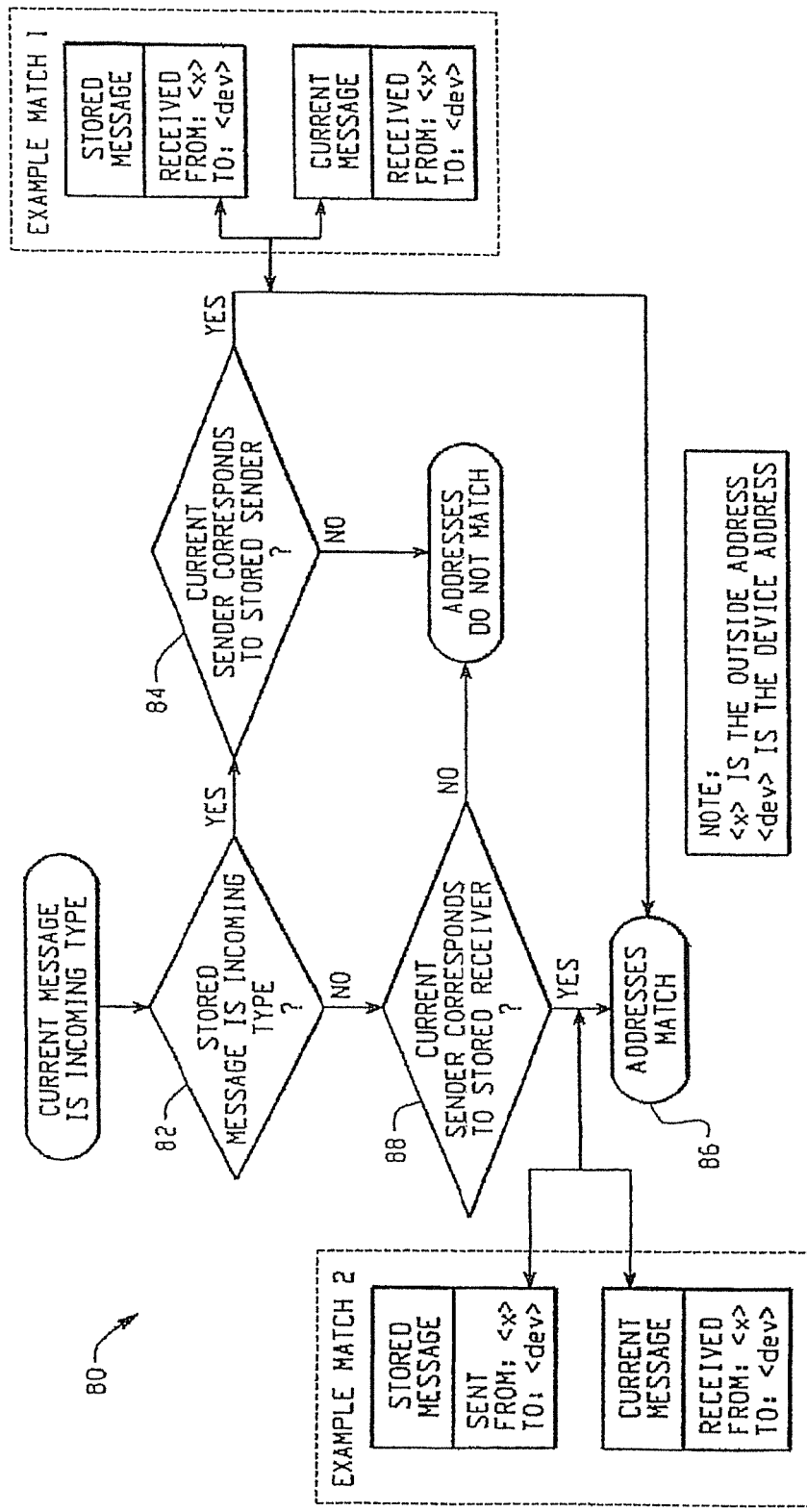
FIG. 4 is a flow diagram showing an exemplary method for determining whether the outside address of an incoming current electronic message matches the outside address of a stored electronic message.

FIG. 4 is a flow diagram showing an exemplary method 80 for determining whether the outside address of an incoming current electronic message matches the outside address of a stored electronic message. In step 82, it is determined whether the stored electronic message is an incoming or outgoing type message. If the stored electronic message is of the incoming type, then the sender address of the current electronic message is compared with the sender address of the stored electronic message (step 84). The outgoing addresses of the current and stored electronic messages match if these two sender addresses correspond. (Step 86). If, on the other hand, the stored electronic message is of the outgoing type, then the sender address of the current electronic message is compared with the receiver address of the stored electronic message (step 88). If the sender and receiver addresses correspond, then the outside addresses match (step 86).

Figure 5:
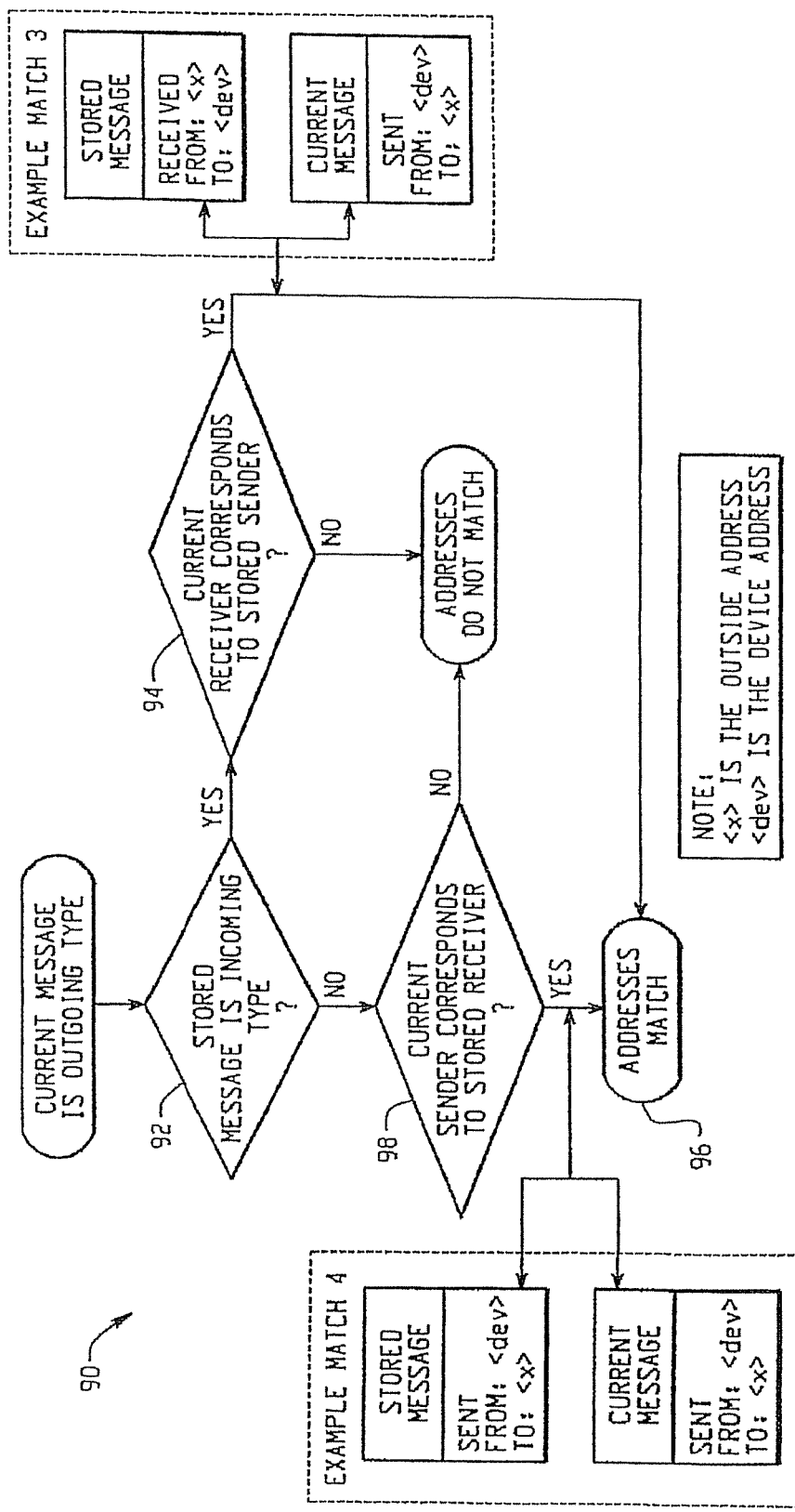
FIG. 5 is a flow diagram showing an exemplary method for determining whether the outside address of an outgoing current electronic message matches the outside address of a stored electronic message.

FIG. 5 is a flow diagram showing an exemplary method 90 for determining whether the outside address of an outgoing current electronic message matches the outside address of a stored electronic message. In step 92, it is determined whether the stored electronic message is an incoming or outgoing message. If the stored electronic message is of the incoming type, then the receiver address of the current electronic message is compared with the sender address of the stored electronic message (step 94). If the receiver and sender addresses correspond, then the outside addresses match (step 96). If, however, the stored electronic message is of the outgoing type, then the receiver address of the current electronic message is compared with the receiver address of the stored electronic message (step 98). If these two receiver addresses correspond, then the outgoing addresses match.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention claimed is:

1. A method of operating a wireless device, the method comprising
    storing transmitted and received electronic messages in a memory of the wireless device;
    selecting a current electronic message;
    identifying at least one related message from the stored electronic messages having an outside address that matches an outside address of the current electronic message; and
    displaying the at least one related message in context with the current electronic message on a display of the wireless device.

2. The method of claim 1, wherein the outside address of the current message and the outside address of the at least one related message are different types, the method further comprising reducing the outside address of the current message and the outside address of the at least one related message to a common form.

3. The method of claim 2, further comprising displaying the common form of the outside address of the current message and the outside address of the at least one related message.

4. The method of claim 1, wherein the identifying and the displaying are done automatically and without user input.

5. The method of claim 1, wherein the outside address of the current electronic message and the outside address of the at least one related message comprise matching telephone numbers.

6. The method of claim 1, wherein the current message and the at least one related message are the only messages displayed.

7. The method of claim 1, wherein the current message is displayed directly above at least one related message.

8. The method of claim 1, wherein the current message and the at least one related message are displayed in a scrollable message viewer.

9. A wireless device comprising:
    a memory;
    a processor;
    a viewing screen; and
    a message software interface module stored in the memory and executable by the processor, the message software interface module configured to:
    store transmitted and received electronic messages in the memory;
    select a current electronic message;
    identify at least one related message from the stored electronic messages having an outside address that matches an outside address of the current electronic message; and
    display the at least one related message in context with the current electronic message on the viewing screen.

10. The wireless device of claim 9, wherein the outside address of the current message and the outside address of the at least one related message are different types, the message software interface module being further configured to reduce the outside address of the current message and the outside address of the at least one related message to a common form.

11. The wireless device of claim 10, the message software interface module being further configured to display the common form of the outside address of the current message and the outside address of the at least one related message.

12. The wireless device of claim 9, wherein the identifying and the displaying are done automatically and without user input.

13. The wireless device of claim 9, wherein the outside address of the current electronic message and the outside address of the at least one related message comprise matching telephone numbers.

14. The wireless device of claim 9, wherein the current message and the at least one related message are the only messages displayed.

15. The wireless device of claim 9, wherein the current message is displayed directly above at least one related message.

16. The wireless device of claim 9, wherein the current message and the at least one related message are displayed in a scrollable message viewer.

17. A non-transitory computer readable media comprising computer instructions executable by a processor for operating a wireless device, the computer instructions configured to:
    store transmitted and received electronic messages in a memory of the wireless device;
    select a current electronic message;

identify at least one related message from the stored electronic messages having an outside address that matches an outside address of the current electronic message; and display the at least one related message in context with the current electronic message on a display of the wireless device.

18. A method of operating a wireless device, the method comprising:

storing transmitted and received electronic messages in a memory of the wireless device;

selecting a current electronic message;

identifying all related messages from the stored electronic messages, each related message having an outside address that matches an outside address of the current electronic message; and displaying all the related messages in context with the current electronic message in a scrollable message viewer.

19. A wireless device comprising:

a memory;

a processor;

a scrollable message viewer; and a message software interface module stored in the memory and executable by the processor, the message software interface module configured to:

select a current electronic message;

identify all related messages from the stored electronic messages, each related message having an outside address that matches an outside address of the current electronic message; and display all the related messages in context with the current electronic message in the scrollable message viewer.

20. A non-transitory computer readable media comprising computer instructions executable by a processor for operating a wireless device, the computer instructions configured to:

select a current electronic message;

identify all related messages from the stored electronic messages, each related message having an outside address that matches an outside address of the current electronic message; and display all the related messages in context with the current electronic message in a scrollable message viewer.

* * * * *